United States Patent [19]

Wilson

[11] Patent Number: 4,871,263
[45] Date of Patent: Oct. 3, 1989

[54] PROTECTIVE TUBE FOR A TEMPERATURE SENSOR

[75] Inventor: Richard F. Wilson, Fort Wayne, Ind.

[73] Assignee: Pyromation, Inc., Fort Wayne, Ind.

[21] Appl. No.: 194,148

[22] Filed: May 16, 1988

[51] Int. Cl.⁴ .............................................. G01K 1/12
[52] U.S. Cl. ..................................... 374/139; 374/140; 136/230; 136/232; 136/234
[58] Field of Search ................... 374/139, , 140; 73/9, 73/DIG. 9; 136/234, 232, 230, 228

[56] References Cited

U.S. PATENT DOCUMENTS

| | | | |
|---|---|---|---|
| 2,672,493 | 3/1954 | Tingle et al. | 136/234 |
| 2,706,411 | 4/1955 | Bircher | 136/234 |
| 2,963,532 | 12/1960 | Bell | 136/234 |
| 2,971,041 | 2/1961 | France | 136/234 |
| 3,246,520 | 4/1966 | Gaskill et al. | 136/234 |
| 3,398,027 | 8/1968 | Lajaprige et al. | 136/234 |
| 3,580,744 | 5/1971 | Shingoinouye et al. | 136/234 |
| 3,647,558 | 3/1972 | McMurtry | 136/234 |
| 3,725,134 | 4/1973 | Gessner et al. | 136/234 |
| 3,756,082 | 9/1973 | Bardenheuer et al. | 136/234 |
| 3,785,216 | 3/1957 | Winner, Jr. | 136/234 |
| 3,923,552 | 12/1975 | Parris | 136/234 |
| 3,935,032 | 1/1976 | Brandeberry et al. | 374/147 |
| 4,450,314 | 5/1984 | Huther | 136/239 |
| 4,521,639 | 6/1985 | Falk | 374/139 |
| 4,535,640 | 8/1985 | Falk | 73/864.55 |
| 4,582,951 | 4/1986 | Shuttleworth | 136/234 |
| 4,645,865 | 2/1987 | Cassidy | 136/234 |
| 4,776,705 | 10/1988 | Nassar et al. | 136/234 |

FOREIGN PATENT DOCUMENTS

| | | | |
|---|---|---|---|
| 515844 | 8/1955 | Canada | 136/234 |
| 108431 | 4/1983 | European Pat. Off. | 374/139 |
| 95102 | 11/1983 | European Pat. Off. | 374/139 |
| 2236966 | 2/1973 | Fed. Rep. of Germany | 374/139 |

Primary Examiner—William A. Cuchlinski, Jr.
Assistant Examiner—Diego F. F. Gutierrez
Attorney, Agent, or Firm—Barnes & Thornburg

[57] ABSTRACT

A protective tube for a temperature sensor, such as a thermocouple assembly, comprises an inner metal tube which is open on either end, a thermally conductive plug for attaching to and closing one end of the tube, and a surrounding layer of refractory ceramic fiber material. The refractory ceramic fiber material is bonded to a portion of the outer surface of the metal tube and to a portion of an outer surface of the thermally conductive plug. In especially preferred embodiments, the refractory ceramic fiber material is preformed in individual tube sections which are conveniently slid over the outside diameter of the inner metal tube and, in some cases, a portion of the thermally conductive plug. Bonding is preferably achieved by a layer of refractory cement disposed between at least portions of the outer surfaces of the inner tube and thermally conductive plug and the inner surfaces of the tube sections. The thermally conductive plug is provided with an inner bore for receiving the temperature sensor. At least a portion of the outer surface of the thermally conductive plug remains exposed for contacting material having a temperature to be measured. Ceramic fiber sealing tape or refractory cement is used to seal joints between adjacent abutting sections of the individual refractory ceramic fiber tube sections.

41 Claims, 1 Drawing Sheet

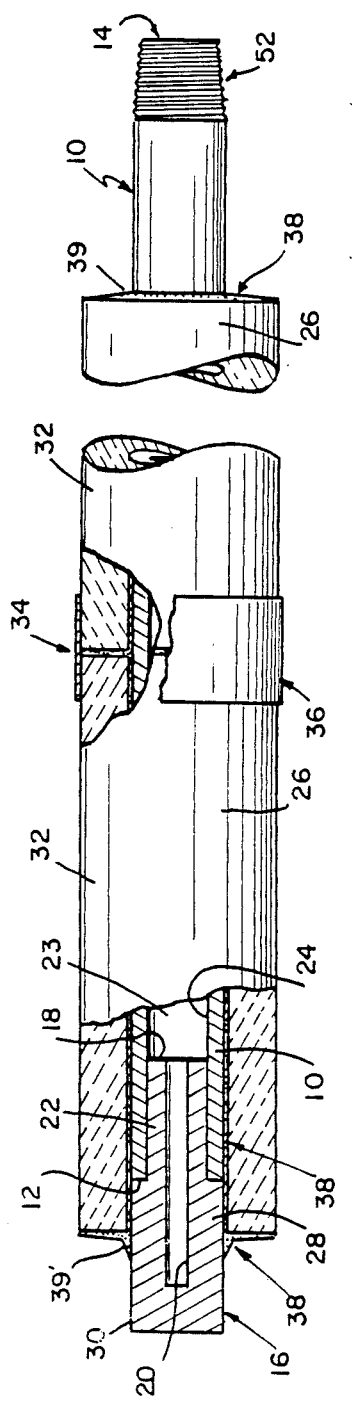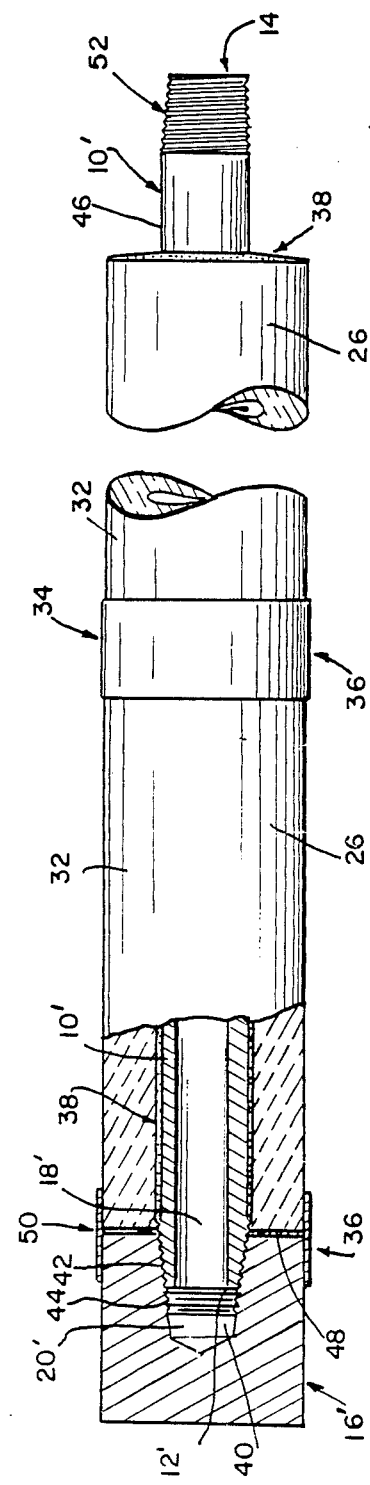

PROTECTIVE TUBE FOR A TEMPERATURE SENSOR

BACKGROUND AND SUMMARY OF THE INVENTION

This invention relates to a protective tube for a temperature sensor, such as a thermocouple assembly, which is used for measuring temperatures of a material, such as a molten metal.

It is often necessary to measure the temperature of molten metals, such as aluminum and steel, during production or other industrial processes. The temperatures encountered in these operations are quite high, typically ranging from 660° C. to 1540° C. and higher. In addition, the corrosive nature of the metallurgical processes involved present problems which must be addressed in the design of protective apparatus for immersible temperature sensors. Materials such as slag and the molten metal encountered in various metallurgical processes are corrosive and abrasive and can dissolve and erode protective devices used with immersible temperature sensors. Further, certain protective devices do not provide satisfactory transmission of heat from the molten metal to a temperature sensor (e.g., a thermocouple assembly). Poor thermal conductors used in construction of such protective devices may substantially retard the transmission of heat to the sensor such that a relatively long period of time is required for temperature measurement, and the response time of the system to changes in material temperature is slow.

Thus, there exists a need for a protective device for a temperature sensor which provides for fast thermal response of the sensor to temperature changes, and which also exhibits good resistance to corrosion and erosion by molten materials. Additionally, it is also highly desirable to provide such a protective device having a relatively simple structure which is easy to manufacture, and which may be produced from relatively inexpensive and readily available materials.

An object of the present invention is to provide a protective tube for protecting a temperature sensor, such as a thermocouple assembly, which is used for making intermittent or continuous temperature measurements in a molten material.

A further object of the present invention is to provide a protective tube which protects a temperature sensor from a hostile molten metal environment, and which does not significantly corrode or erode with continuous or repeated use.

Yet another object of the present invention is to provide a protective tube for a temperature sensor which allows the temperature sensor to respond rapidly to temperature changes of the material whose temperature is to be measured.

It is a further object of the present invention to provide a protective tube for a temperature sensor which is relatively simple and inexpensive to manufacture, and which is reliable in its operation.

Thus, an overall object of the present invention is to provide a protective tube for protecting a temperature sensor, such as a thermocouple assembly, which balances resistance to corrosion and erosion by the materials being measured, overall response time of the temperature sensing assembly, and simple and inexpensive construction to achieve an improved overall design.

These objects and other objects of the invention are achieved by providing a protective device which has an inner tube element, preferably formed of metal, which is surrounded by refractory ceramic fiber material elements on a first immersible portion thereof. The refractory ceramic fiber material elements are preferably bonded to the inner tube element. A thermally conductive plug, which includes an inner bore portion for receiving a temperature sensor, is joined to the end of the immersible portion of the inner tube element, thereby closing the otherwise open immersible end of the tube element. At least a portion of the thermally conductive plug element is exposed for contacting a material having a temperature to be measured.

The invention provides rapid and accurate thermal measurement when the immersible end of the protective tube assembly is immersed in the material through the thermally conductive plug element which receives and substantially surrounds the temperature sensor. The inner metal tube element is protected from the material (e.g., molten metal) by the refractory ceramic fiber elements. At least a portion of the thermally conductive plug element is exposed to the material undergoing measurement, such that rapid and accurate temperature measurements are achieved. Since the thermally conductive plug element need only be provided at the end area of the inner tube element, a relatively inexpensive arrangement is provided.

According to advantageous features of certain preferred embodiments of the invention, the refractory ceramic fiber elements surround at least a portion of an outer surface of the thermally conductive plug element, in addition to the immersible end of the inner metal tube element. However, at least a portion of the thermally conductive plug element remains exposed for establishing direct contact with the material in which it is to be immersed.

According to other advantageous features of certain preferred embodiments of the invention, the bonding material used to bond the refractory ceramic fiber elements to the inner metal tube element is refractory cement. A substantially continuous layer of refractory cement may be provided between the outer surface of the inner tube and the inner surface of the ceramic fiber element or, alternatively, these components may be spot-bonded together using the refractory cement to reduce assembly time and material costs.

In certain preferred embodiments, the refractory ceramic fiber elements are formed as individual refractory tube sections which abut one another, and which are placed around the inner metal tube element. The refractory tube sections are preferably preformed in sections that are approximately twelve inches long. These embodiments provide for increased simplicity in forming the protective tube. The preformed refractory tube sections slide over the inner metal tube element and, according to certain preferred embodiments, are bonded to the inner metal tube element by refractory cement.

According to other advantageous features of certain preferred embodiments of the invention, the thermally conductive plug element extends outwardly from the end of the inner metal tube element, such that the inner bore of the thermally conductive plug element also extends out from the inner metal tube element. Thus, the thermocouple assembly, which is received in the bore of the conductive plug element, extends out from the inner metal tube element and the refractory material covering the inner metal tube element.

According to other advantageous features of certain preferred embodiments of the invention, refractory tape is applied over abutting sections of the individual refractory tube sections to seal the joints created by this construction. In other embodiments, refractory tape can also be applied over an abutting area of the thermally conductive plug and the adjacent refractory ceramic fiber element.

According to other advantageous features of certain preferred embodiments of the invention, the thermally conductive plug element is formed of graphite or silicon carbide material.

Other objects, advantages and novel features of the present invention will become apparent from the following detailed description of the invention when considered in conjunction with the accompanying drawings.

BRIEF DESCRIPTION OF THE DRAWINGS

FIG. 1 is a partial cross-sectional side view of a protective tube assembly according to certain preferred embodiments of the present invention; and FIG. 2 is a partial cross-sectional side view of a protective tube assembly according to other preferred embodiments of the present invention.

DETAILED DESCRIPTION OF THE DRAWINGS

FIG. 1 shows a first preferred embodiment of a protective tube assembly, constructed in accordance with the present invention, for receiving and protection of a temperature sensor, such as a thermocouple assembly. An inner metal tube 10 has an open end 12 on an immersible end thereof, and an open end 14 on an opposing non-immersible end. Inner metal tube 10 can be made of several materials including, by way of example only, carbon steel, stainless steel, or nickel alloy steel. A commercially available tubing or pipe of standard dimensions can be used.

A thermally conductive plug 16 is disposed in the area of open immersible end 12 of metal tube 10. Thermally conductive plug 16 has an open end 18 and an inner bore 20 for receiving a sensor, such as a thermocouple assembly (not shown). Inner bore 20 extends outwardly from immersible open end 12 of inner metal tube 10. Several different types of thermally conductive materials can be used to construct plug 16. However, the use of graphite or silicon carbide is preferred. Specific examples of such materials which may be used are Union Carbide Corp. Type AGSR or AGSX graphite material and products sold by Ferro Corporation, such as silicon nitride bonded silicon carbide, KELLOGG 3AD silicate bonded silicon carbide or recrystallized silicon carbide.

As shown in FIG. 1, a portion 22 of thermally conductive plug 16 extends into an interior bore 23 of inner metal tube 10. Several techniques and methods can be used for joining thermally conductive plug 16 to inner metal tube 10. In certain embodiments, portion 22 of thermally conductive plug 16 includes threads on an outer surface thereof which engage threads on inner surface 24 of inner metal tube 10. In other embodiments, an adhesive is used for the attachment. Other possible techniques include wedging or fusing. Furthermore, these methods and techniques can be used in combination with one another.

In the preferred embodiment shown in FIG. 1, inner tube 10 has an outside diameter which is substantially constant over the length of the tube. A portion 28 of thermally conductive plug 16 lying immediately adjacent to open end 12 of tube 10 has an outside diameter which is substantially equal to the outside diameter of tube 10. Refractory ceramic fiber elements 26 surround the immersible portion of inner metal tube 10 and portion 28 of thermally conductive plug 16. As shown in FIG. 1, a portion 30 of thermally conductive plug 16 is not surrounded by refractory ceramic fiber element 26, and thus is exposed to the material to be measured when the assembly is immersed.

According to certain preferred embodiments, the refractory ceramic fiber material is provided in the form of preformed individual tube sections 32 which abut one another at joints 34. Individual tube sections 32 have an inside diameter which is substantially equal to, or slightly larger than, the outside diameters of inner metal tube 10 and portion 28 of thermally conductive plug 16. Thus, individual tube sections 32 can be slid onto inner metal tube 10 to provide protection of varying lengths and can be cut to the proper size when required. A relatively snug fit between these components is preferred, especially if the tube sections are spot bonded to the inner tube by relatively small amounts of refractory cement.

Examples of individual ceramic fiber tube sections suitable for use with the present invention are KAOWOOL brand ceramic fiber products sold by Babcock and Wilcox Company. This material is approximately 45% alumina ($Al_2O_3$); 52% silica ($SiO_2$); 2% titanium oxide ($TiO_2$); 1% ferric oxide ($Fe_2O_3$), with small amounts of magnesium oxide (MgO), calcium oxide (CaO), alkalis such as $Na_2O$ and boron oxide ($B_2O_3$). The blend of fiber and binders varies. The protection tubes are formed from a slurry which is vacuum formed into a concentric shape. Individual sections come in various lengths, such as twelve inches, and a range of/ inner and outer diameters. In the present invention, the preferred range of thickness of the ceramic fiber sleeve is $\frac{1}{2}$ inch. These dimensions may vary, depending upon the intended temperatures of use and other factors. The KAOWOOL material is very resistant to chemical attack.

As shown in FIG. 1, abutting joint 34 between adjacent refractory tube elements 32 is surrounded by ceramic fiber tape 36. Tape 36 secures abutting refractory tube elements 32, and seals joints 34 therebetween. An example of suitable ceramic fiber tape is a polycrystalline metal oxide fiber material woven into a textile tape form. A commercially available product of this type is NEXTEL 312 ceramic fiber tape sold by 3M Company. The NEXTEL 312 fibers include metal oxides (by weight) 62% aluminum oxide ($Al_2O_3$); 14% boron oxide ($B_2O_3$) and 24% silicon dioxide ($SiO_2$). These tapes can withstand extremely high temperatures and exhibit strong chemical resistance. The NEXTEL 312 woven tape is but one example of a sealing tape suitable for use with the present invention. Although the preferred embodiments illustrated in the figures incorporate ceramic fiber tape to seal joints 34, an adequate seal may also be attained with refractory cement or other materials.

Referring again to FIG. 1, individual refractory tube sections 32 are bonded to inner metal tube 10 with refractory cement 38. Covered portion 28 of thermally conductive plug 16 is also bonded to refractory tube section 32 with refractory cement 38. Further, refractory cement 38 is used to seal a juncture area 39 of inner metal tube 10 and refractory tube section 32, and a juncture area 39' of conductive plug 16 and refractory tube section 32. Although a substantially continuous layer of refractory cement may be used, it is preferred to use only as much cement as is required to hold the refractory fiber tube sections in position and to adequately seal the juncture areas 39' and abutting joints between adjacent tube sections.

In certain preferred embodiments, a thin coat of refractory cement 38 is applied to at least a portion of the outer surface of inner metal tube 10 and covered portion 28 of thermally conductive plug 16, and refractory tube sections 32 are then slid over inner metal tube 10 and portion 28 of thermally conductive plug 16. It is also contemplated to slide the refractory tube sections onto inner metal tube 10, and subsequently inject refractory cement into each juncture.

Refractory cement 38 bonds refractory tube sections 32 to inner metal tube 10 and thermally conductive plug 16. As discussed above, once refractory tube sections 32 are in place, abutting joint(s) 34 is (are) surrounded by the ceramic fiber sealing tape. Any of several well known types of refractory cement can be used with the present invention. Examples are wet air set or sairset cements.

As shown in FIG. 1, the construction of a protective tube according to the present invention is relatively simple and requires few parts. A thermocouple assembly (not shown) is inserted into open end 14 of inner metal tube 10 and is positioned within inner bore 20 of thermally conductive plug 16. The protective tube is then immersed into a material (such as molten aluminum) whose temperature is to be measured. The thermocouple assembly and associated wires are protected from the material environment by the refractory ceramic fiber material, the refractory cement and the thermally conductive plug. However, since a portion of thermally conductive plug 16 is exposed to the material, superior thermal response and accuracy are achieved. Only a relatively small portion of the entire protective tube is made of the thermally conductive material (e.g., graphite or silicon carbide), and thus overall material expenses are kept low. Further, construction is simplified as individual tube sections of refractory material 32 can be slid easily onto inner tube 10 and bonded in place by refractory cement material 38. Attachment or joinder of thermally conductive plug 16 is also by simple means.

FIG. 2 shows another preferred embodiment of a protective tube according to the present invention. In the embodiment shown in FIG. 2, individual refractory tube sections 32 are again placed over an inner metal tube 10'. As in the embodiment of FIG. 1, individual tube sections 32 of refractory material are bonded to inner metal tube 10' with refractory cement 38. Abutting joint areas 34 of refractory tube sections 32 are covered and sealed with ceramic fiber sealing tape 36.

The major difference between the embodiment shown in FIG. 2 and the embodiment shown in FIG. 1 is the construction and attachment of the thermally conductive plug. In the embodiment shown in FIG. 2, thermally conductive plug 16' has an inner bore 20' with an open end 18' and an inner surface 40 which, in the embodiment illustrated, is adapted to receive immersible end 12' of inner metal tube 10'. Thermally conductive plug 16' can be attached to inner metal tube 10' using any of several methods. A preferred method includes threads 42 and 44 provided, respectively, on inner surface 40 of thermally conductive plug 16' and outer surface 46 of inner metal tube 10'.

The outer diameter of thermally conductive plug 16' is preferably substantially equal to the outer diameters of individual refractory tube sections 32. This structure facilitates establishment and maintenance of a proper seal between plug 16' and adjacent tube section 32.

In the embodiment of FIG. 2, thermally conductive plug 16' includes a surface 48 which abuts an end of adjacent individual refractory tube section 32 covering the immersible end of inner metal tube 10'. This abutment creates a joinder line 50 similar to the joinder line 34 between abutting individual refractory tube sections 32. As with joinder line 34, joinder line 50 between thermally conductive plug 16' and refractory tube section 32 is surrounded by ceramic fiber sealing tape 36. However, this joint may also be sealed with refractory cement or other suitable materials.

In either embodiment, non-immersible end 14 of inner metal tube 10, 10' can include threads 52 on an outer surface thereof, or other means for attaching the assembly to another tube, or to a device used for immersing the protective tube into molten material.

The protective tube of the present invention, as illustrated in FIGS. 1 and 2, provides a balance fast thermal response, effective resistance to corrosion and erosion, reduced costs, and simplicity of construction. Although the invention has been described and illustrated in detail by reference to the embodiments illustrated, it is to be clearly understood that the same is by way of illustration and example only, and is not to be taken by way of limitation. The spirit and scope of the present invention are to be limited only by the terms of the appended claims.

What is claimed:

1. A protective tube for a temperature sensor, comprising:
   metal inner tube means having first and second open ends;
   refractory ceramic fiber means surrounding at least a portion of an outer surface of one end of said inner tube means;
   means for bonding said refractory ceramic fiber means to said outer surface of said first portion of said inner tube means;
   non-metallic, thermally conductive plug means having an inner bore portion for receiving the temperature sensor; and
   means for joining said thermally conductive plug means to said inner tube means so as to close said first open end of said tube means;
   wherein said temperature sensor and said first end of the metal inner tube means are protected by the non-metallic plug and the refractory ceramic fiber means, and wherein at least a portion of said thermally conductive plug means is exposed for contacting a material having a temperature to be measured.

2. A protective tube according to claim 1, wherein said bonding means comprises refractory cement disposed between said inner tube means and said refractory ceramic fiber means.

3. A protective tube according to claim 1, wherein said refractory ceramic fiber means comprises a plurality of individual refractory tube sections.

4. A protective tube according to claim 3, wherein adjacent ones of said individual tube sections abut one another to form abutting joints, and further comprising means for sealing said abutting joints.

5. A protective tube according to claim 4, wherein said means for sealing said abutting joints comprises at least one of a ceramic fiber sealing tape and a refractory cement.

6. A protective tube according to claim 1, wherein said thermally conductive plug means abuts said refractory ceramic fiber means at an abutting joint, and further comprising means for sealing said abutting joint.

7. A protective tube according to claim 6, wherein said means for sealing said abutting joint comprises at least one of a ceramic fiber sealing tape and a refractory cement.

8. A protective tube according to claim 1, wherein said means for joining said thermally conductive plug means to said inner tube means comprises mating threads disposed on said plug and tube means.

9. A protective tube according to claim 1, wherein said means for joining said thermally conductive plug means to said inner tube means includes threads on an outer surface of said thermally conductive plug means engagable with threads on an inner surface of said inner tube means.

10. A protective tube according to claim 1, wherein a portion of said thermally conductive plug means is surrounded by said refractory ceramic fiber means.

11. A protective tube according to claim 1, wherein said thermally conductive plug means is formed of at least one of graphite and silicon carbide.

12. Protective tube for a temperature sensor, such as a thermocouple, comprising:
   metal inner tube means having first and second open ends;
   non-metallic, thermally conductive plug means having an inner bore portion for receiving the temperature sensor;
   joining means for joining said thermally conductive plug means to said first open end of said inner tube means so as to close said open end;
   refractory ceramic fiber means surrounding at least a portion of an outer surface of said inner tube means, and disposed adjacent a portion of an outer surface of said thermally conductive plug means, at least a portion of said thermally conductive plug means remaining exposed for contacting a material having a temperature to be measured; and
   bonding means for bonding said refractory ceramic fiber means to said outer surface of said inner tube means and said outer surface of said thermally conductive plug means.

13. A protective tube according to claim 12, wherein said bonding means comprises refractory cement disposed between said surfaces of said inner tube means and said thermally conductive plug means, and said refractory ceramic fiber means.

14. A protective tube according to claim 12, wherein said refractory ceramic fiber means comprises a plurality of individual refractory tube sections.

15. A protective tube according to claim 14, wherein said plurality of individual tube sections abut one another to form abutting joints, and further comprising means for sealing said abutting joints.

16. A protective tube according to claim 15, wherein said means for sealing said abutting joints comprises at least one of a ceramic fiber sealing tape and a refractory cement.

17. A protective tube according to claim 14, wherein said bonding means comprises refractory cement disposed between said inner tube means and said individual refractory tube sections.

18. A protective tube according to claim 14, wherein said thermally conductive plug means comprises an end portion extending outwardly from said first end of said inner tube means, and wherein at least a portion of said inner bore is disposed in said outwardly extending end portion of said thermally conductive plug means.

19. A protective tube according to claim 14, wherein said joining means includes threads on an outer surface of a portion of said thermally conductive plug means, engagable with threads on an inner surface of said inner tube means.

20. A protective tube according to claim 14, wherein said thermally conductive plug means is formed of at least one of graphite and silicon carbide.

21. A protective tube for a temperature sensor, such as a thermocouple assembly, comprising:
   metal inner tube means having first and second generally elongate portions and having first and second open ends, said first portion of said tube means having a substantially constant outer diameter;
   non-metallic, thermally conductive plug means for attachment to the first end of said inner tube means, at least a portion of said thermally conductive plug means having an outer diameter substantially equal to said outer diameter of said inner tube means; and
   refractory ceramic fiber tube means having an inner diameter substantially equal to, or slightly larger than, the outer diameter of said inner tube means;
   wherein said refractory ceramic fiber tube means is disposed over said first portion of said inner tube means and said portion of said thermally conductive plug means having an outer diameter substantially equal to said outer diameter of said inner tube means.

22. A protective tube according to claim 23, wherein said refractory ceramic fiber tube means comprises individual tube sections, and further comprising means for sealing a joint formed between adjacent tube sections.

23. A protective tube according to claim 23, wherein said inner tube means has an open end and an inner diameter, and wherein at least a portion of said thermally conductive plug means has an outer diameter substantially equal to the inner diameter of said tube means, and wherein said portion of said thermally conductive plug means is disposed within the open end of said inner tube means.

24. A protective tube according to claim 23, wherein a portion of an inside surface of the inner tube means and a portion of an outside surface of the thermally conductive plug means are provided with mating threads.

25. A protective tube for a temperature sensor, such as a thermocouple assembly, comprising:
   metal inner tube means having first and second generally elongate portions and having first and second open ends, said first portion of said tube means having a substantially constant outer diameter;
   non-metallic, thermally conductive plug means for attachment to the first end of said inner tube means, said thermally conductive plug means having an inner bore portion for receiving the temperature sensor, and at least a portion of said thermally conductive plug means having a substantially constant outer diameter;

refractory ceramic fiber tube means having an inner diameter substantially equal to the outer diameter of the inner tube means, and having an outer diameter substantially equal to the outer diameter of said portion of the thermally conductive plug means;

means for providing a seal at a joint formed by abutting edges of said refractory ceramic fiber tube means and said constant diameter portion of said thermally conductive plug means; and means for attaching the thermally conductive plug means to the first open end of the inner tube means so as to close said open end of said tube means;

wherein said refractory ceramic fiber tube means is disposed over said first portion of said inner tube means and is disposed adjacent to said constant diameter portion of said thermally conductive plug means.

26. A protective tube according to claim 27, further comprising means for bonding the refractory ceramic fiber tube means to said inner tube means.

27. A protective tube according to claim 28, wherein said means for bonding comprises a layer of refractory cement disposed between at least a portion of an inner surface of the refractory ceramic fiber tube means and an outer surface of the inner tube means.

28. A protective tube for a temperature sensor, comprising:
a metal inner tube having first and second open ends;
a refractory ceramic fiber outer tube surrounding at least a portion of said metal inner tube;
a non-metallic, thermally conductive plug having a blind bore for receiving the temperature sensor; and
means for joining the non-metallic plug to the metal inner tube so as to align the blind bore of the plug with the first open end of the metal tube to close said end, and so as to create an interface between the thermally conductive plug and the refractory ceramic fiber tube;
wherein said first end of the inner metal tube is surrounded by the non-metallic plug, the refractory ceramic fiber outer tube, and means for sealing said interface, and wherein at least a portion of the plug is exposed for contacting a material having a temperature to be measured.

29. A protective tube according to claim 28, further comprising means for bonding said refractory ceramic fiber outer tube to at least said portion of said metal inner tube.

30. A protective tube according to claim 29, wherein said means for bonding comprises refractory cement.

31. A protective tube according to claim 28, wherein said non-metallic thermally conductive plug is formed from a refractory material, such as graphite and silicon carbide.

32. A protective tube according to claim 28, wherein said means for sealing said interface comprises at least one of a ceramic fiber sealing tape and a refractory cement.

33. A protective tube according to claim 28, wherein said refractory ceramic fiber outer tube comprises a plurality of individual tube sections, and wherein adjacent ones of the individual tube sections abut one another to form abutting joints, and further comprising means for sealing said abutting joints.

34. A protective tube according to claim 33, wherein said means for sealing said interface comprises at least one of a ceramic fiber sealing tape and a refractory cement.

35. A protective tube according to claim 28, wherein said thermally conductive plug has an outer diameter which is substantially equal to an outer diameter of the first end of the inner tube, and wherein said refractory ceramic fiber outer tube surrounds substantially all of the first end of the inner tube and at least a portion of said thermally conductive plug.

36. A protective tube according to claim 35, wherein said interface is created between an outer surface of the thermally conductive plug and an inner surface of the refractory ceramic fiber tube, and wherein said interface is sealed with refractory cement.

37. A protective tube according to claim 28, wherein said thermally conductive plug has an outer diameter which is substantially greater than an outer diameter of the metal tube, and which is less than or substantially equal to an outer diameter of the refractory ceramic fiber tube, and wherein said interface is created at abutting surfaces of the thermally conductive plug and the refractory ceramic fiber tube.

38. A protective tube according to claim 37, wherein said means for bonding comprises refractory cement.

39. A protective tube according to claim 37, wherein said means for joining the non-metallic thermally conductive plug to the metal inner tube comprises mating threads on at least a portion of an inner surface of said plug and on at least a portion of an outer surface of said metal inner tube.

40. A protective tube according to claim 28, wherein said means for joining the thermally conductive plug to the metal inner tube comprises mating threads formed on said plug and tube.

41. A protective tube according to claim 28, wherein said means for joining the thermally conductive plug to the metal inner tube comprises mating threads formed on an outer surface of said thermally conductive plug and on an inner surface of said metal inner tube.

* * * * *